Jan. 9, 1951 — R. M. WITT — 2,537,563
FLUID PRESSURE OPERATING DEVICE
Filed Feb. 20, 1945 — 3 Sheets-Sheet 1
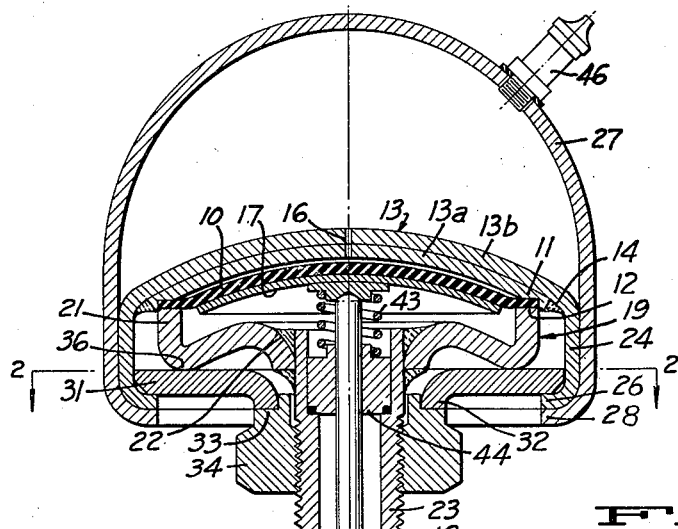
FIG_1_
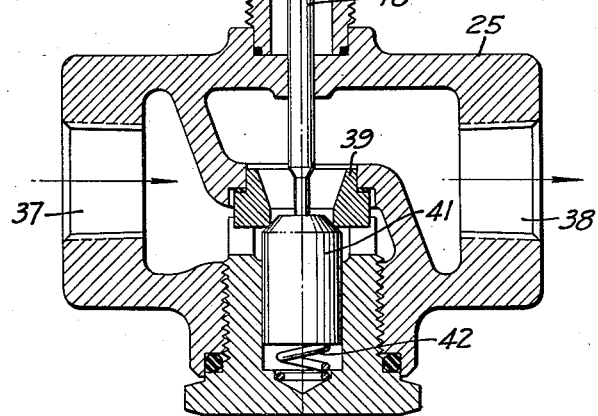
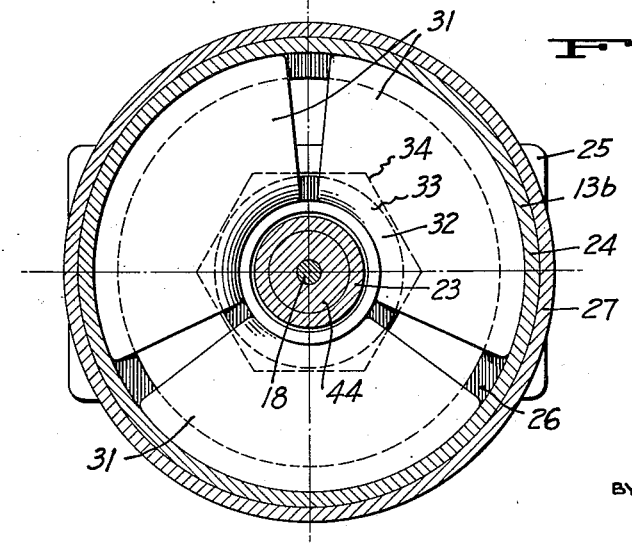
FIG_2_
INVENTOR
Richard M. Witt
BY
Paul D. Flehr
ATTORNEY Jan. 9, 1951 R. M. WITT 2,537,563
FLUID PRESSURE OPERATING DEVICE
Filed Feb. 20, 1945 3 Sheets-Sheet 2
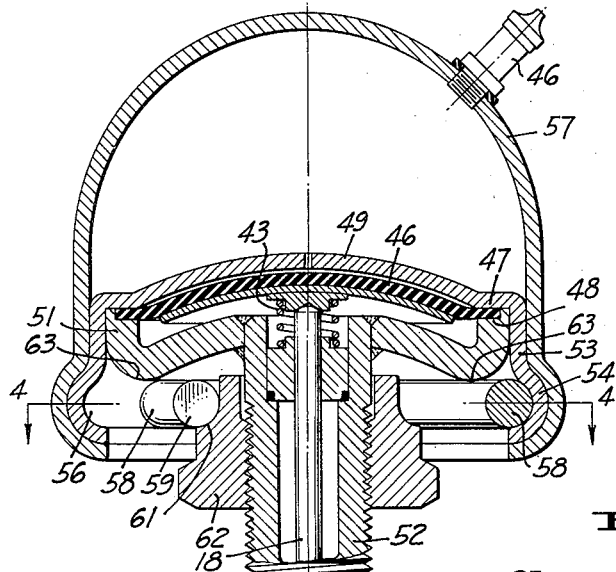
FIG_3_
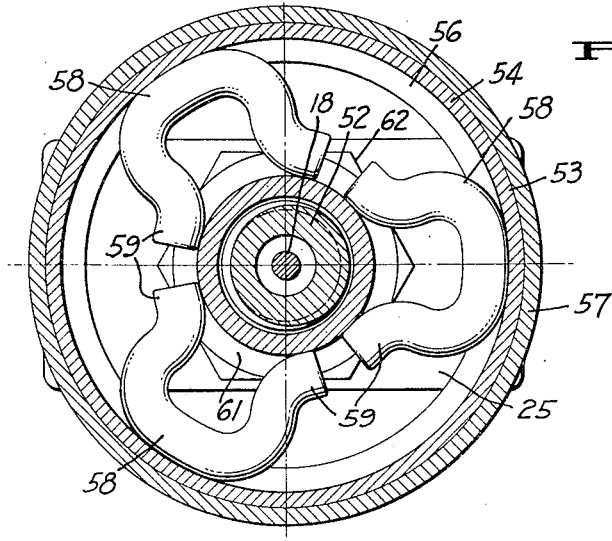
FIG_4_
INVENTOR
Richard M. Witt
BY
Paul D. Feeler
ATTORNEY Jan. 9, 1951 R. M. WITT 2,537,563
FLUID PRESSURE OPERATING DEVICE
Filed Feb. 20, 1945 3 Sheets-Sheet 3
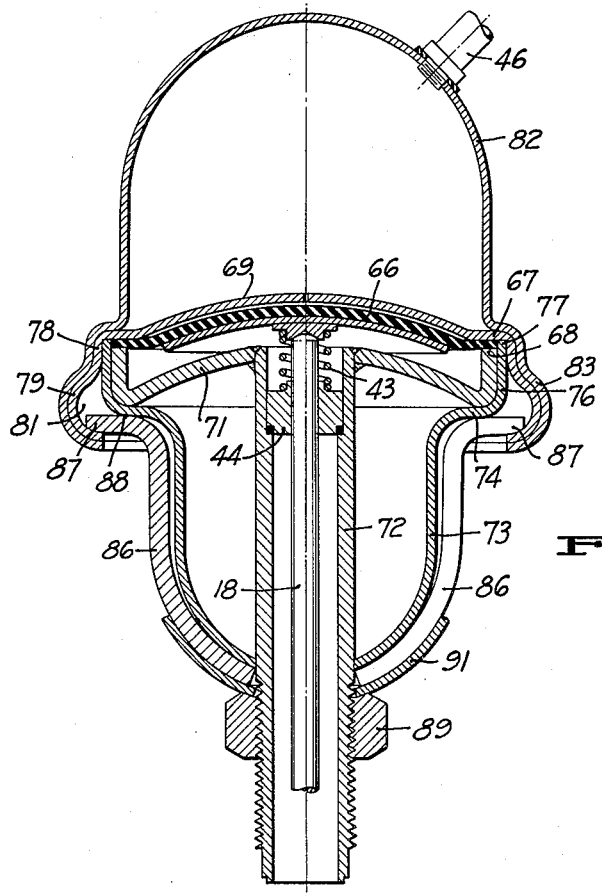
FIG_5_
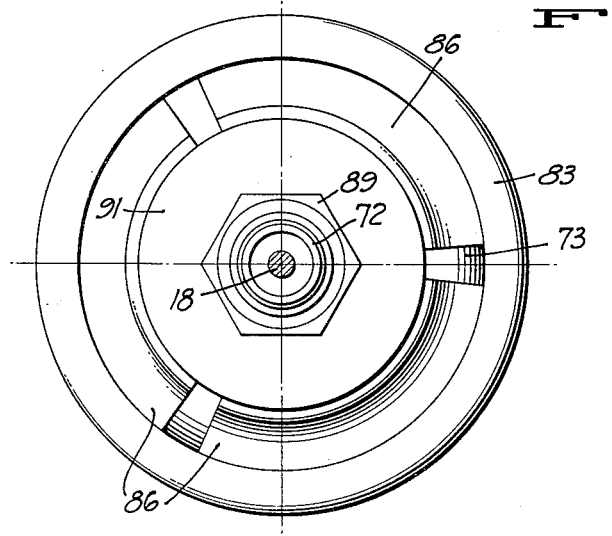
FIG_6_
INVENTOR
BY Richard M. Witt
Paul D. Flehr
ATTORNEY Patented Jan. 9, 1951

2,537,563

UNITED STATES PATENT OFFICE 2,537,563

FLUID PRESSURE OPERATING DEVICE

Richard M. Witt, San Francisco, Calif., assignor, by mesne assignments, to Grove Regulator Company, a corporation of California Application February 20, 1945, Serial No. 578,883

2 Claims. (Cl. 137—157)

This invention relates generally to fluid pressure operated devices and equipment, and particularly to diaphragm mountings used in connection with the same.

In the mounting of flexible diaphragms it is conventional practice to employ clamping flanges which are secured together by circumferentially spaced screws or bolts, and which have annular areas for gripping the peripheral margin of the diaphragm. Conventional constructions of this type are subject to certain disadvantages. For example the flanges considerably increase the overall diameter of the assembly, the use of screws or bolts located at circumferentially spaced intervals about the flanges requires considerable manual labor to apply and remove, and the screws or bolts must be carefully tightened to a predetermined degree about the entire periphery in order to provide evenly distributed clamping pressure.

It is an object of the present invention to provide a diaphragm mounting which will dispense with the use of conventional flanges and clamping screws or bolts.

It is a further object of the invention to provide a construction which will make possible application of properly distributed clamping forces to the margin of the diaphragm by manipulation of a single member.

Another object of the invention is to provide an assembly for mounting a diaphragm which will have a diameter only slightly greater than the diameter of the diaphragm itself.

Another object of the invention is to provide an assembly of the above character which is adaptable to manufacture from mill run sheet metal, as distinguished from castings or forgings.

Additional objects of the invention will appear from the following description in which the preferred embodiments have been set forth in detail in conjunction with the accompanying drawing.

Referring to the drawing—

Figure 1 is a side elevational view in section showing a regulating device incorporating the present invention.

Figure 2 is a cross-sectional detail taken along the line 2—2 of Figure 1.

Figure 3 is a side elevational view, partly in section, showing another embodiment of the invention.

Figure 4 is a cross-sectional detail taken along the line 4—4 of Figure 3.

Figure 5 is a side elevational view, in section, showing another embodiment of the invention.

Figure 6 is a bottom plan view of the assembly shown in Figure 5.

The embodiment of the invention shown in Figure 1 consists generally of a diaphragm 10, which can be made of suitable flexible material such as natural or synthetic rubber. This diaphragm is circularly contoured and its margin is normally clamped between the annular areas 11 and 12, formed on the members to be presently described. Overlying the diaphragm there is a rigid metal plate 13, which in this instance is fabricated from two sheet metal parts 13a and 13b, suitably secured together as by welding 14. Part 13a is machined to form the flat annular area 11. Plate 13 in this instance corresponds to the orifice plate incorporated in the fluid pressure regulator disclosed and claimed in Patent No. 2,047,101 and is accordingly provided with a restricted orifice 16. Both the plate 13 and diaphragm 10 can be cupped as illustrated, to conform substantially to the segment of a sphere.

The underside of diaphragm 10 is engaged by the movable diaphragm plate 17, which is likewise dished, and which engages the upper end of a thrust or operating rod 18.

The space below the diaphragm 10 is confined by a circularly contoured member 19, which in quarter section is preferably substantially S-shaped. The outer upturned edge portion of flange 21 of member 19 is machined to provide the area 12. The inner portion of member 19 is secured as by welding 22 to the upper end of tube 23. This tube surrounds the operating rod 18, and has its lower end attached to the valve body 25 or like device with which the diaphragm assembly is being used.

The member 13b of the diaphragm plate 13 is extended to provide an annular downwardly extending flange 24, which merges with an inturned flange 26 forming an annular shoulder or ledge.

The space above the diaphragm plate 13 in this instance is enclosed by the dome 27, which is made preferably of pressed sheet metal and dimensioned to fit upon the flange 24. The lower edge of the dome 27 is likewise inturned to provide the flange 28. The surfaces in contact between the dome 27 and portions 24 and 26 of the orifice plate 13 are secured together as by means of brazing or silver solder to form a fluid tight seal.

The clamping means utilized with the assembly described above makes use of a plurality of lever elements 31, which in this instance are in the form of segmentally contoured plates (Figure 2). The inner edges 32 of these plates are downturned as shown in Figure 1, and engage an annular shoulder 33 formed on a nut 34 which is threaded upon tube 23. The outer edges of plates 31 engage upon the ledge formed by the inturned flange 26. The upper face of each plate 31 also has an arcuate line of contact with the curved face 36 of member 19. This line of contact is preferably located closer to the outer than to the inner edges of plates 31, in order to provide leverage with a mechanical advantage.

The valve body 25 has the customary passages 37 and 38 for flow of fluid, and a stationary valve seat 39 cooperating with a movable valve member 41. This valve member is urged upwardly by spring 42 and abuts the lower end of operating rod 18. A light spring 43 can also be provided between the guide bushing 44 and the movable diaphragm plate 17.

Operation of the device or assembly described above is as follows: Assuming that the device is being used as a pressure reducing regulator, a source of high pressure gas or fluid is connected to inlet 37, and the lower pressure piping or system is connected to outlet 38. Gas under pressure is introduced into dome 27 through fitting 46 to provide a desired loading pressure upon the diaphragm 10. The outlet side of the valve is in communciation with the space below the diaphragm 17, by way of the clearances about the operating rod 18. The diaphragm therefore serves to automatically position the valve member 41 in accordance with variations in pressure on the outlet side, in order to maintain the outlet pressure substantially constant. Such operation and the manner in which the plate 13 with orifice 16 serves to stabilize operation and prevent chattering, is described and claimed in the aforesaid Grove Patent No. 2,047,101. Clamping pressure upon the peripheral margin of the resilient diaphragm 10 is determined by the setting of nut 34. By turning this nut in a direction to move the same upwardly, lever elements 31 apply greater forces to the inturned flange 26 and to member 19, whereby areas 11 and 12 are urged more tightly upon opposite sides of the diaphragm. When it is desired to remove the diaphragm the nut 34 is turned in a direction to retract the same after which it is possible to remove the elements 31. Dome 27 together with diaphragm plate 13 can now be removed bodily from the remainder of the assembly, because the opening through the flange 26 is made slightly greater than the outer diameter of member 19. To reassemble the mounting it is only necessary to replace the dome together with diaphragm plate 13 in the position shown in Figure 1, with the diaphragm 13 in place, after which the lever elements 31 are repositioned in engagement with flange 26 and the nut 34. Then the nut is turned to apply forces to the lever elements as previously described until the proper degree of clamping pressure has been applied to the diaphragm between the areas 11 and 12.

The embodiment of Figures 3 and 4 differ from Figures 1 and 2, particularly in that the lever elements in this instance are formed of bent rods, instead of plates. Thus in this instance the diaphragm 46 has its peripheral margin clamped between areas 47 and 48 which in turn are formed upon orifice plate 49 and member 51. Member 51 corresponds to member 19 of Figure 1, and is likewise secured as by welding to the tube 52. The lower end of this tube is connected to the device to be operated by the diaphragm, such as the valve shown in Figure 1. Diaphragm plate 49 has a downwardly extending flange 53, the lower portion of which is curved in cross section to provide an inwardly faced recess 56. The dome 57, corresponding to the dome 27 of Figure 1, is closely fitted about flange 53 and curved portion 54, and is secured and sealed thereto as by means of brazing or soldering.

Clamping forces are applied by the lever elements 58 which are formed from metal rods bent substantially U-shaped as shown in Figure 4. The extremities 59 of these bent lever elements engage the annular shoulder 61 formed on the tightening nut 62. The outer portions of the lever elements fit within the recess 56. The lever elements also engage the face 63 of member 51, in substantially the same manner as the lever plates 31 of Figure 1 engage member 19. The U-shaped lever elements 58 can likewise be removed upon loosening the nut 62, in order to permit the dome together with the diaphragm plate to be removed bodily, for repair or replacement of the diaphragm.

In the embodiment of Figures 5 and 6 the lever elements are in a more accessible position and are shaped to form substantially a cluster. Thus in this instance the diaphragm 66 has its peripheral margin gripped between the annular areas 67 and 68, formed on the orifice plate 69 and member 71 respectively. Member 71 is also secured as by welding to the tube 72, corresponding to tube 23 of Figure 1. Below the member 71 there is a dome shaped member 73 which has an upper outwardly flared portion 74, and an upwardly extending annular flange 76 which surrounds the periphery of member 71. The portions in contact between member 71 and flange 76 can be permanently secured together and sealed as by means of brazing or silver soldering. The upper edge 77 of flange 76 extends above the area 68 and about the periphery of the diaphragm, and forms an abutment shoulder to prevent too great compression of the diaphragm. Orifice plate 69 has a depending annular portion 78 which surrounds portion 76, and which terminates in a curved portion 79, to form the curved recess 81.

The dome 82 has a lower enlarged portion 83 which is shaped to fit closely about the portions 78 and 79 formed on the orifice plate 69. The surfaces in contact are secured together and sealed as by means of brazing or soldering.

The clamping means consists of a plurality of elements 86 which when grouped together about the bell shaped member 73, are curved similarly to this member without however fitting in close contact with the same. Outwardly extending edges 87 provided on elements 86 engage within the recesses 81 and in addition these elements contact along an arcuate line with the bell shaped member 73, as indicated at 88. A tightening nut 89 is threaded upon tube 72, and interposed between this nut and the adjacent extremities of lever elements 86, there is a retaining cup 91. By tightening nut 89 it is apparent that the adjacent extremities of lever elements 86 are forced inwardly and upwardly, thereby causing the flange portions 87 to apply clamping forces urging the areas 67 and 68 upon the margins of the diaphragm. Here again the lever elements can be removed after loosening nut 89, to permit separation of the parts for renewal of the diaphragm.

In all of the embodiments described above properly distributed clamping forces are applied by manipulation of a single member as distinguished from tightening a large number of screws or bolts as in conventional constructions. Clamping forces can be applied of a magnitude comparable to that obtained by conventional constructions. The overall diameter of such an assembly can be made relatively small and not greatly in excess of the diaphragm diameter, because of the absence of outwardly extending flanges. The principal parts of the assembly can be made of pressed mill run sheet metal, in place of castings or forgings. Thus as in Figure 1 diaphragm plate 13, member 19, dome 27 and lever plates 31 are all formed of mill run sheet metal. When made in accordance with my invention it is a simple matter to design the parts so that they are capable of withstanding relatively high fluid pressures, as for example pressures of the order of 500 to 3000 p. s. i. or more.

The invention is applicable to a wide variety of appliances where flexible diaphragms are employed, such as pressure reducing and back pressure regulators, pressure relief valves, and diaphragm motor valves.

I claim:

1. In a fluid pressure operating device having a pressure chamber in which is arranged a diaphragm subjected to the pressure therein and a movable operating rod extending at right angles to said diaphragm and operatively connected thereto, the combination with said diaphragm of a dome-shaped member, a diaphragm plate member disposed adjacent one side of the diaphragm and having a peripheral rim fitted within the annular margin of the dome-shaped member, portions of said rim and said annular margin being bent to form engaging shoulders to lock said plate member within the dome-shaped member and to provide an annular ledge spaced from and faced toward the diaphragm, a third annularly contoured member disposed within the annular margin of the dome-shaped member, said third member together with the plate member providing opposed annular shoulders for gripping the peripheral edge portion of the diaphragm, and lever means serving to releasably clamp said plate and third member to grip the diaphragm, said lever means including a plurality of lever members arranged in engagement with said ledge.

2. The combination as in claim 1 together with a tube secured to the third member, the operating rod extending through the tube, said third member being formed to provide an annular shoulder on a diameter less than that of the ledge and greater than that of the tube, said shoulder being adapted to form a fulcrum for said lever members, and a nut-like member threaded on the tube and serving to engage the inner ends of said levers, the outer ends of said levers being in engagement with said ledge.

RICHARD M. WITT.

REFERENCES CITED

The following references are of record in the file of this patent:

UNITED STATES PATENTS

| Number | Name | Date |
| --- | --- | --- |
| 1,062,300 | Pierce | May 20, 1913 |
| 1,243,974 | Powers | Oct. 23, 1917 |
| 1,659,201 | Jewell | Feb. 14, 1928 |
| 1,885,457 | Lord | Nov. 1, 1932 |
| 2,045,303 | Ludington | June 23, 1936 |